United States Patent
Wang et al.

(10) Patent No.: US 11,943,249 B2
(45) Date of Patent: Mar. 26, 2024

(54) CYBERSPACE COORDINATE SYSTEM CREATION METHOD AND APPARATUS BASED ON AUTONOMOUS SYSTEM

(71) Applicant: TSINGHUA UNIVERSITY, Beijing (CN)

(72) Inventors: Jilong Wang, Beijing (CN); Shuying Zhuang, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 351 days.

(21) Appl. No.: 17/385,950

(22) Filed: Jul. 27, 2021

(65) Prior Publication Data

US 2021/0360020 A1    Nov. 18, 2021

Related U.S. Application Data

(63) Continuation of application No. PCT/CN2019/097739, filed on Jul. 25, 2019.

(30) Foreign Application Priority Data

Feb. 21, 2019 (CN) ............... 201910128925.7

(51) Int. Cl.
H04L 29/06 (2006.01)
G06T 17/00 (2006.01)
(Continued)

(52) U.S. Cl.
CPC .......... *H04L 63/1433* (2013.01); *G06T 17/00* (2013.01); *H04L 41/12* (2013.01); *H04L 61/5007* (2022.05)

(58) Field of Classification Search
None
See application file for complete search history.

(56) References Cited

U.S. PATENT DOCUMENTS 6,535,227 B1 * 3/2003 Fox ............... H04L 41/28
709/224
7,092,857 B1 * 8/2006 Steiner .............. G06N 3/042
703/2
(Continued)

FOREIGN PATENT DOCUMENTS

CN    101408931 A    4/2009
CN    101557324 A    10/2009
(Continued)

OTHER PUBLICATIONS

Lu Guonian, Yuan Linwang, Yu Zhaoyuan, "Surveying and Mapping Geographical Information from the Perspective of Geography", Acta Geodaetica et Cartographica Sinica, Oct. 2017, vol. 46, No. 10, pp. 1549-1556, Abstract only.

*Primary Examiner* — Maung T Lwin (57) ABSTRACT

A cyberspace coordinate system creation method and apparatus based on an autonomous system is provided. The method includes: determining a cyberspace coordinate system; constructing a framework for a three-dimensional cyberspace coordinate system; constructing a cyberspace map model based on the cyberspace coordinate system and the framework for the three-dimensional cyberspace coordinate system; and designing an application scenario corresponding to a constructed cyberspace map model, and performing visualization processing on the application scenario. The method may realize the visualization of multi-dimensional information of cyberspace based on a unified and constant backboard, e.g., an Autonomous System (AS) topology, an Internet Protocol (IP) address composition, network resource element information, a hierarchical structure, and the like, and is suitable for visualization of a number of security attacks on the cyberspace and network management scenarios.

7 Claims, 7 Drawing Sheets

---

Determining that the cyberspace coordinate system uses the ASN as the basic vector, and mapping the one-dimensional ASN to the two-dimensional coordinate system based on the predetermined algorithm

↓

Constructing the framework for the three-dimensional cyberspace coordinate system, orthogonalizing the time sequence of IP address allocation under the AS determined as the third-dimension basic vector to the two-dimensional AS coordinate space, and analyzing and mapping the IP address of the key attribute of cyberspace

↓

Constructing the cyberspace map model to support the visualization expression of cyberspace, and meet requirements such as the multi-scale traversal in cyberspace, the object locating, and the network topology visualization

↓

Designing and visualizing application scenarios of the map, and providing a map device that displays cyberspace in multiple dimensions (51) Int. Cl.
*H04L 9/40* (2022.01)
*H04L 41/12* (2022.01)
*H04L 61/5007* (2022.01)

(56) References Cited

U.S. PATENT DOCUMENTS

| | | | | |
|---|---|---|---|---|
| 8,121,973 | B2* | 2/2012 | Anderson | G06F 11/3447 |
| | | | | 709/224 |
| 8,421,796 | B2* | 4/2013 | Song | G06Q 40/04 |
| | | | | 345/440.2 |
| 9,912,689 | B2* | 3/2018 | Peteroy | H04L 63/0421 |
| 9,973,406 | B2* | 5/2018 | Gorman | H04L 41/22 |
| 2009/0028067 | A1* | 1/2009 | Keeni | H04L 41/12 |
| | | | | 370/254 |
| 2009/0207166 | A1 | 8/2009 | Song et al. | |
| 2013/0321458 | A1* | 12/2013 | Miserendino | H04L 41/22 |
| | | | | 345/629 |
| 2017/0230791 | A1* | 8/2017 | Jones | H04L 9/088 |
| 2018/0121574 | A1* | 5/2018 | Srinivasan | G06F 13/4068 |

FOREIGN PATENT DOCUMENTS

| | | |
|---|---|---|
| CN | 101887595 A | 11/2010 |
| CN | 101938509 A | 1/2011 |
| CN | 103646127 A | 3/2014 |
| CN | 107623594 A | 1/2018 |
| CN | 108023771 A | 5/2018 |
| CN | 109981346 A | 7/2019 |

* cited by examiner

| Determining that the cyberspace coordinate system uses the ASN as the basic vector, and mapping the one-dimensional ASN to the two-dimensional coordinate system based on the predetermined algorithm |

↓

| Constructing the framework for the three-dimensional cyberspace coordinate system, orthogonalizing the time sequence of IP address allocation under the AS determined as the third-dimension basic vector to the two-dimensional AS coordinate space, and analyzing and mapping the IP address of the key attribute of cyberspace |

↓

| Constructing the cyberspace map model to support the visualization expression of cyberspace, and meet requirements such as the multi-scale traversal in cyberspace, the object locating, and the network topology visualization |

↓

| Designing and visualizing application scenarios of the map, and providing a map device that displays cyberspace in multiple dimensions |

FIG. 4

| | | | | | | | | | | | | | |
|---|---|---|---|---|---|---|---|---|---|---|---|---|---|
| Cernet | BNU-CN | BJMU-CN | NJTU-CN | NANKAI-CN | GDUT-CN | KMUST-CN | SYSUMS-CN | CRMU-CN | CUEB-CN | IMU-CN | GDUFS-CN | BUPT-CN | SWIEE-CN |
| | NWAU-CN | CQUC-CN | WYU-CN | GZU-CN | SXU-CN | YSU-CN | SZU-CN | SECINFO-CN | SCNU-CN | CQJZU-CN | GUANGZU... | YNPU-CN | XAIPT-CN |
| XJTU-CN | HAINNU-CN | GDMC-CN | NWU-CN | HEBAU-CN | CDUST-CN | YNU-CN | STU-CN | SWJU-CN | BJAU-CN | LEU-CN | GUANGZT... | XAUAT-CN | HEBTU-CN |
| ZHONGSHAN-CN | GZIT-CN | CQU-CN | BJFU-CN | CUGB-CN | XAIT-CN | CDIGMR-CN | XAMU-CN | HEBUT-CN | XIDIAN-CN | BLCU-CN | CAMS-CN | SWIT-CN | USTB-CN |
| | SSTU-CN | BJPU-CN | XAHU-CN | XJU-CN | BJUCMP-CN | TIANJIN-CN | HBU-CN | BUAA-CN | SCUU-CN | HUIZU-CN | XAPI-CN | CQUPT-CN | NWILI-CN |
| JINAN-CN | LU-CN | GZIFT-CN | LZRI-CN | BJIT-CN | WCUMS-CN | YNNU-CN | XAUT-CN | YNAU-CN | FOSU-CN | SWNU-CN | YJ... XA... | C... D... | SWU... C... | GUA... F... | NLC... M... |
| UESTC-CN | NWPU-CN | FMMU-CN | DGSSTI-CN | NXU-CN | GXU-CN | SWUPL-CN | TUT-CN | GDCC-CN | YNIFT-CN | NWNU-CN | S... | BJ... | CD... | G... G... | B C |

CYBERSPACE COORDINATE SYSTEM CREATION METHOD AND APPARATUS BASED ON AUTONOMOUS SYSTEM

The present application is a continuation of International Application No. PCT/CN2019/097739, filed on Jul. 25, 2019, which claims priority to Chinese Patent Application No. 201910128925.7, titled "CYBERSPACE COORDINATE SYSTEM CREATION METHOD AND APPARATUS BASED ON AUTONOMOUS SYSTEM" and filed by Tsinghua University on Feb. 21, 2019.

TECHNICAL FIELD

The present disclosure belongs to the field of cyberspace modeling and visualization technologies, and more particularly, to a cyberspace coordinate system creation method and apparatus based on an Autonomous System (AS).

BACKGROUND

As a "man-made" digital, information-based, and intelligent virtual space, cyberspace has been widely concerned by various countries and has been raised to a level of national security. In the *National Strategy to Secure Cyberspace*, the United States clarified a strategic position of cyberspace security and defined cyberspace as "a 'nervous system' and national control system that ensure the normal operation of the country's critical infrastructure." The *National Cyber Security Strategy* issued by the United Kingdom believes that cyberspace is an interactive domain composed of digital networks for information storage, modification and transmission, and is an important strategic resource carrier for the country.

In recent years, in the *National Cyberspace Security Strategy*, China has defined that cyberspace includes the Internet, a communication network, a computer system, an automated control system, a digital device, and applications, services, and data carried by them, and has actively promoted research in the field of cyberspace security. Also, as the second-largest space parallel to geographic space, cyberspace is deeply affecting people's production and lifestyle.

However, the current research on cyberspace is relatively limited, for a reason that a basic conceptual model and space theory foundation has not been established yet. Also, restricted by the conventional geographic coordinate system and network topology coordinate system which cannot comprehensively express cyberspace, there is a lack of basic models and tools to express cyberspace from an original of cyberspace.

The most fundamental task of building a space model is to construct a cyberspace coordinate system. Taking geographic space as an example, cartography researches on transforming a three-dimensional sphere into a two-dimensional plane through projection mapping, and uses longitudes and latitudes as basic vectors to construct a two-dimensional geographic coordinate system to form a unified mapping backboard for geographic space. For cyberspace, conventional research based on mature theoretical models such as geographic coordinate systems and topological coordinate systems can only map cyberspace to other spaces to express single-dimensional information, such as a geographic characteristic and a topological relationship, and cannot provide a constant, comprehensive and intuitive method for describing and expressing cyberspace. Therefore, it is urgent to construct a unique coordinate system architecture and map model in cyberspace to realize space modeling and visualization of network scenarios.

SUMMARY

The present disclosure aims to solve at least one of the technical problems in the related art to some extent.

To this end, an object of the present disclosure is to provide a cyberspace coordinate system creation method based on the AS. The method may realize the visualization of multi-dimensional information of cyberspace based on a unified and constant backboard, including an AS topology, an Internet Protocol (IP) address composition, network resource element information, a hierarchical structure, and the like, and is suitable for visualization of a number of security attacks on cyberspace and network management scenarios.

Another object of the present disclosure is to provide a cyberspace coordinate system creation apparatus based on an AS.

To achieve the above object, in an aspect, an embodiment of the present disclosure provides a cyberspace coordinate system creation method based on an AS. The method includes: determining a cyberspace coordinate system; constructing a framework for a three-dimensional cyberspace coordinate system; constructing a cyberspace map model based on the cyberspace coordinate system and the framework for the three-dimensional cyberspace coordinate system; and designing an application scenario corresponding to a constructed cyberspace map model, and performing visualization processing on the application scenario.

In the cyberspace coordinate system creation method based on the AS according to an embodiment of the present disclosure, a framework design scheme for a two-dimensional cyberspace coordinate system determining an Autonomous System Number (ASN) as a basic vector is provided. The Hilbert mapping algorithm is selected to achieve visualization of dimension ascending of the one-dimensional ASN. A time sequence of IP address allocation under the AS determined as a third-dimension basic vector is orthogonalized to the ASN. As a result, the framework for the three-dimensional cyberspace coordinate system is constructed, where an IP address of a key attribute of the cyberspace can be analyzed and mapped. The cyberspace map model is constructed to support a visualization expression of the cyberspace. A method based on a rectangular tree diagram supports multi-scale traversal of the cyberspace and positioning of cyberspace objects, thereby expressing elements of the cyberspace in a hierarchical and scalable manner, such as a network composition under the AS, and an IP composition under the network. In addition, network topology visualization is supported, a concept of a topological thematic map is introduced, and a force-directed algorithm is adopted to visualize the AS topology relationship in cyberspace. Finally, a map application scenario is designed, and visualization is realized. The present disclosure provides a mapping apparatus that displays the cyberspace in different dimensions.

In addition, in an embodiment of the present disclosure, the cyberspace coordinate system creation method based on the AS may further include the following additional technical features.

Further, in an embodiment of the present disclosure, the cyberspace coordinate system is a two-dimensional coordinate system. Said determining the cyberspace coordinate system includes mapping, based on a predetermined algorithm, a one-dimensional AS Number (ASN) to a two-dimensional coordinate space. Said mapping, based on the predetermined algorithm, the one-dimensional ASN to the two-dimensional coordinate space includes performing dimension ascending mapping on the ASN by using a Hilbert mapping algorithm, and determining that coordinates of the two-dimensional cyberspace coordinate system collectively represent an AS attribute of cyberspace.

Further, in an embodiment of the present disclosure, said constructing the framework for the three-dimensional cyberspace coordinate system includes orthogonalizing a time sequence of IP address allocation under the AS determined as a third-dimension basic vector to a two-dimensional AS coordinate space, and analyzing and mapping an IP address of a key attribute of cyberspace.

Further, in an embodiment of the present disclosure, the framework for the three-dimensional cyberspace coordinate system is a three-dimensional coordinate system that includes a third-dimension coordinate axis perpendicular to a basic vector of a two-dimensional AS. Said orthogonalizing the time sequence of the IP address allocation under the AS determined as the third-dimension basic vector to the two-dimensional AS coordinate space includes a third coordinate axis perpendicular to the two-dimensional coordinate system representing the time sequence of the IP address allocation under the AS, and a positive direction representing sequence increment. Said analyzing and mapping the IP address of the key attribute of cyberspace includes: modeling cyberspace by defining a three-dimensional coordinate system space, and locating any cyberspace resource element based on the IP address of a key identifier of communication, wherein a Z-axis mapping algorithm is described as sorting, based on allocation time, all IP addresses under the jurisdiction of a certain AS in ascending order, and sorting IP addresses under the same allocation time from small to large in decimal, and their serial numbers are mapped to a third-dimension coordinate system; and analyzing and mapping the IP address by locating a coordinate based on a Hilbert algorithm and the Z-axis mapping algorithm.

Further, in an embodiment of the present disclosure, said constructing the cyberspace map model based on the cyberspace coordinate system and the framework for the three-dimensional cyberspace coordinate system includes: determining that a hierarchical structure of cyberspace is divided into three layers: the AS, a network, and an IP; and defining a sphere mode of the cyberspace.

Further, in an embodiment of the present disclosure, said designing the application scenario corresponding to the constructed cyberspace map model, and performing the visualization processing on the application scenario includes: calculating, based on a mapping algorithm, coordinates of an attack source and a destination IP address in a three-dimensional cyberspace coordinate system based on the AS and IP address to visualize a real-time attack scenario, wherein a flying line represents an attack direction, and a line thickness represents attack traffic.

To achieve the above object, in another aspect, an embodiment of the present disclosure provides a cyberspace coordinate system creation apparatus based on an AS. The apparatus includes: a determination module configured to determine a cyberspace coordinate system; a first construction module configured to construct a framework for a three-dimensional cyberspace coordinate system; a second construction module configured to construct a cyberspace map model based on the cyberspace coordinate system and the framework for the three-dimensional cyberspace coordinate system; and a design visualization module configured to design an application scenario corresponding to a constructed cyberspace map model, and perform visualization processing on the application scenario.

In the cyberspace coordinate system creation apparatus based on the AS according to an embodiment of the present disclosure, a framework design scheme for a two-dimensional cyberspace coordinate system determining an ASN as a basic vector is provided. The Hilbert mapping algorithm is selected to achieve visualization of dimension ascending of the one-dimensional ASN. A time sequence of IP address allocation under the AS determined as a third-dimension basic vector is orthogonalized to the two-dimensional AS coordinate space. The framework for the three-dimensional cyberspace coordinate system is constructed. An IP address of a key attribute of the cyberspace is analyzed and mapped. The cyberspace map model is constructed to support a visualization expression of the cyberspace. A method based on a rectangular tree diagram supports multi-scale traversal of the cyberspace and positioning of cyberspace objects, thereby expressing elements of the cyberspace in a hierarchical and scalable manner, such as a network composition under the AS, and an IP composition under the network. In addition, network topology visualization is supported, a concept of a topological thematic map is introduced, and a force-directed algorithm is adopted to visualize the AS topology relationship in the cyberspace. Finally, a map application scenario is designed, and visualization is realized. The present disclosure provides a map apparatus that displays the cyberspace in different dimensions.

In addition, in an embodiment of the present disclosure, the cyberspace coordinate system creation apparatus based on the AS may further include the following additional technical features.

Further, in an embodiment of the present disclosure, the cyberspace coordinate system is a two-dimensional coordinate system. The determination module is configured to map, based on a predetermined algorithm, a one-dimensional AS Number (ASN) to a two-dimensional coordinate space. Said mapping, based on the predetermined algorithm, the one-dimensional ASN to the two-dimensional coordinate space includes performing dimension ascending mapping on the ASN by using a Hilbert mapping algorithm, and determining that coordinates of the two-dimensional cyberspace coordinate system collectively represent an AS attribute of cyberspace.

Further, in an embodiment of the present disclosure, the first construction module is configured to orthogonalize a time sequence of IP address allocation under the AS determined as a third-dimension basic vector to the two-dimensional AS coordinate space, and analyze and map an IP address of a key attribute of cyberspace.

Further, in an embodiment of the present disclosure, the second construction module is configured to: determine that a hierarchical structure of cyberspace is divided into three layers: the AS, a network, and an IP; and define a sphere mode of the cyberspace.

Additional aspects and advantages of the present disclosure will be given at least in part in the following description, or become apparent at least in part from the following description, or may be learned from practicing of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which:

FIGS. 5A and 5B are schematic diagrams showing a hierarchical and multi-scale expression of elements of cyberspace based on a rectangular tree diagram in a cyberspace map model according to an embodiment of the present disclosure;

DESCRIPTION OF EMBODIMENTS

The embodiments of the present disclosure will be described in detail below with reference to examples thereof as illustrated in the accompanying drawings, throughout which same or similar elements are denoted by same or similar reference numerals. The embodiments described below with reference to the drawings are illustrative only, and are intended to explain, rather than limiting, the present disclosure.

A cyberspace coordinate system creation method and apparatus based on an AS according to an embodiment of the present disclosure will be described below with reference to the accompanying drawings.

The cyberspace coordinate system creation method based on the AS according to an embodiment of the present disclosure will be described first with reference to the figures.

Figure 1:
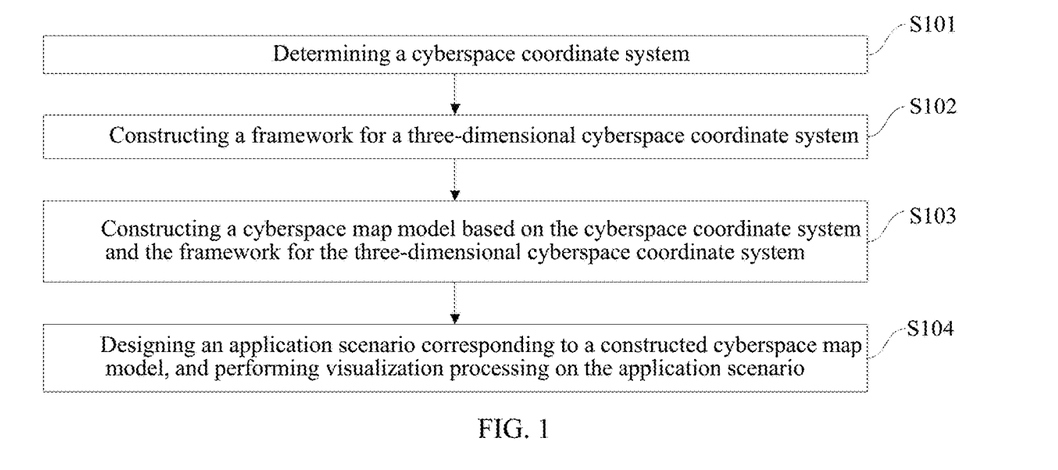
FIG. 1 is a flowchart illustrating a cyberspace coordinate system creation method based on an AS according to an embodiment of the present disclosure.

FIG. 1 is a flowchart illustrating a cyberspace coordinate system creation method based on an AS according to an embodiment of the present disclosure.

As illustrated in FIG. 1, the cyberspace coordinate system creation method based on the AS includes the following steps.

At step S101, a cyberspace coordinate system is determined.

Further, in an embodiment of the present disclosure, the cyberspace coordinate system is a two-dimensional coordinate system.

Determining the cyberspace coordinate system includes mapping, based on a predetermined algorithm, a one-dimensional AS Number (ASN) to a two-dimensional coordinate space.

Mapping, based on the predetermined algorithm, the one-dimensional ASN to the two-dimensional coordinate space includes performing dimension ascending mapping on the ASN by using a Hilbert mapping algorithm, and determining that coordinates of the cyberspace coordinate system collectively represent an AS attribute of cyberspace, which is similar to expressing national information by latitudes and longitudes in a geospatial model.

Specifically, it is determined that the cyberspace coordinate system adopts the ASN as a basic vector, and maps the one-dimensional ASN to the two-dimensional coordinate system based on the predetermined algorithm.

At step S102, a framework for a three-dimensional cyberspace coordinate system is constructed.

Further, in an embodiment of the present disclosure, the method includes: orthogonalizing a time sequence of Internet Protocol (IP) address allocation under the AS determined as a third-dimension basic vector to a two-dimensional AS coordinate space, and analyzing and mapping an IP address of a key attribute of cyberspace.

Specifically, the third-dimension basic vector is determined. The time sequence of the IP address allocation under the AS is orthogonalized to the two-dimensional AS coordinate space to construct a framework for the cyberspace coordinate system. The IP address of the key attribute of cyberspace is analyzed and mapped.

Further, the framework for the three-dimensional cyberspace coordinate system is a three-dimensional coordinate system that includes a third-dimension coordinate axis perpendicular to a basic vector of a two-dimensional AS coordinate space. Orthogonalizing the time sequence of the IP address allocation under the AS determined as the third-dimension basic vector to the AS coordinate space includes: a third coordinate axis perpendicular to the two-dimensional coordinate system representing the time sequence of the IP address allocation under the AS, and a positive direction representing sequence increment. Analyzing and mapping the IP address of the key attribute of cyberspace includes: modeling cyberspace by defining a three-dimensional coordinate system space, and locating any cyberspace resource element based on an IP address of a key identifier of communication, in which a Z-axis mapping algorithm is described as sorting, based on allocation time, all IP addresses under the jurisdiction of a certain AS in ascending order, and sorting IP addresses under the same allocation time from small to large in decimal, a serial number is mapped to a third-dimension coordinate system, and the IP address can be analyzed and mapped by locating a coordinate (x, y, z) based on the above Hilbert algorithm and the Z-axis mapping algorithm; and analyzing and mapping IP address by locating a coordinate based on a Hilbert algorithm and the Z-axis mapping algorithm.

At step S103, a cyberspace map model is constructed based on the cyberspace coordinate system and the framework for the three-dimensional cyberspace coordinate system.

Further, in an embodiment of the present disclosure, constructing the cyberspace map model based on the cyberspace coordinate system and the framework for the three-dimensional cyberspace coordinate system includes: determining that a hierarchical structure of a cyberspace is divided into three layers: the AS, a network, and an IP; and defining a sphere mode of the cyberspace.

Specifically, the constructed cyberspace map model intuitively expresses a hierarchical network structure and an AS topological connection relationship.

At step S104, an application scenario corresponding to the constructed cyberspace map model is designed, and visualization processing is performed on the application scenario.

The cyberspace coordinate system based on the AS is designed to construct the cyberspace map model. The visualization expression of cyberspace is supported. Requirements such as multi-scale traversal in cyberspace, network topology visualization, and locating any object in cyberspace are supported. Hierarchical and scalable map characteristics are realized to meet visualization requirements of displaying the distribution of objects in cyberspace from different hierarchies. Also, a concept of the topological thematic map is introduced to visualize the network topology.

Satisfying the requirements of the multi-scale traversal in cyberspace, object locating, and the network topology visualization includes determining that the hierarchical structure of cyberspace is divided into three layers: the AS, the network, and the IP. Compared with a geographic map model, the AS is analogous to countries, the network corresponds to provinces and cities, and the IP addresses are equivalent to house numbers of residential buildings. A hierarchical and multi-scale expression of resource elements of cyberspace, such as the network composition under the AS and an IP composition under the network, is performed based on a rectangular tree diagram, so as to meet visualization and locating requirements of different levels of network management persons.

A sphere mode of cyberspace is defined to realize the network topology visualization. Take the AS topology as an example, on a basis of the number of IP addresses under the jurisdiction of the AS and the Border Gateway Protocol (BGP) data, the force-directed algorithm is used to map the AS to a new three-dimensional coordinate (X, Y, Z). The size of a sphere of the AS represents the number of IP addresses, and a flying line represents the topological connection relationship between ASes. The sphere mode of cyberspace is also suitable for an internal AS network topology and an IP topology, thereby realizing management over elements and links.

Further, in an embodiment of the present disclosure, designing the application scenario corresponding to the constructed cyberspace map model, and performing the visualization processing on the application scenario includes: calculating, based on a mapping algorithm, coordinates of an attack source and a destination IP address in a three-dimensional cyberspace coordinate system based on the AS to visualize real-time attack scenarios, in which a flying line represents an attack direction, and a line thickness represents attack traffic.

Specifically, designing map an application scenario and implementing visualization includes two scenarios.

Scenario 1: a real-time attack scenario in cyberspace. Coordinates (X, Y, Z) of an attack source and a destination IP address in a three-dimensional cyberspace coordinate system based on the AS are calculated based on a mapping algorithm to visualize the real-time attack scenario. A flying line represents an attack direction. A line thickness represents attack traffic. The traffic characteristic of a network attack is observed by using the AS as a granularity to analyze an attack behavior, thereby assisting a security analyst in better understanding and defending against attacks.

Scenario 2: a DDOS attack scenario in cyberspace. The coordinates (X, Y, Z) of the attack source and the destination IP address in the three-dimensional cyberspace coordinate system based on the AS are calculated based on the mapping algorithm. The line thickness represents attack traffic. Compared with a geographic map, the AS, the network, and IP address information of the attack source and a target can be obtained through different hierarchies of expansions, such that security problems may be quickly located, and vulnerability diagnosis and repair may be performed.

In addition, drawing the above attack scenarios in the topological thematic map may visually display a topological path that an attack went through, thereby realizing topological traceability and discovery of the attack source, and guiding a change of connectivity of the Internet infrastructure when a network security attack is encountered.

In the method, the cyberspace coordinate system architecture with the ASN as the basic vector is determined. Considering that cyberspace is a virtual information space, a free flow of massive information constitutes the instantaneous diversity of cyberspace. Selecting the basic vector that may constantly characterize the nature of cyberspace is very important for building the cyberspace map model.

The AS, as a collection of networks and IP addresses under the control of a management agency, is equivalent to a country in geographic space, and is a basic unit of business exchanges and communications between domains in cyberspace. The Hilbert mapping algorithm is selected to realize visualization of dimension ascending of the one-dimensional ASN. Also, the framework for the cyberspace coordinate system with the time sequence of the IP address allocation under the AS determined as the third-dimension basic vector is constructed, so as to express the key attribute of cyberspace information communication (that is, IP address information).

The cyberspace coordinate system creation method based on the AS of the present disclosure will be described below with reference to the figures and specific embodiments.

Figure 2:
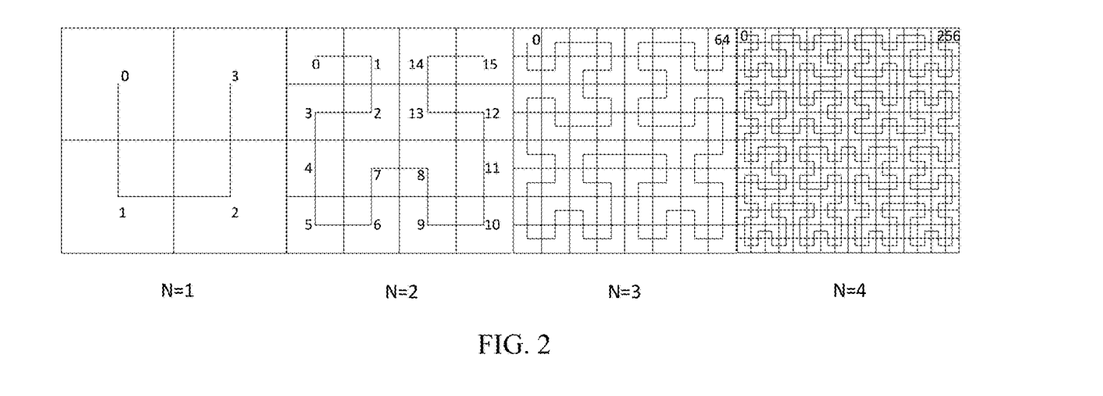
FIG. 2 is a schematic diagram showing mapping one-dimensional ASNs of a specified range to a two-dimensional coordinate space based on a Hilbert mapping algorithm according to an embodiment of the present disclosure.

As illustrated in FIG. 2, the one-dimensional ASNs of a specified range are mapped to the two-dimensional coordinate space based on the Hilbert mapping algorithm. The AS, as the collection of networks and IP addresses under the control of the management agency, is equivalent to a country in the geographic space, and is the basic unit of business exchanges and communications between domains in cyberspace. The Hilbert mapping algorithm, as a dimension ascending algorithm, may map the one-dimensional ASNs of the specified range to a two-dimensional coordinate system space, which helps guarantee the proximity of ASNs, and construct a basic two-dimensional plane of the cyberspace coordinate system.

The Hilbert mapping algorithm will be briefly introduced. An order represents a degree of expansion of Hilbert mapping and a representable range. A detailed algorithm of mapping the ASN to a two-dimensional coordinate (X, Y) is as follows.

Algorithm 1: ASN2xy(ASN, ASNB, n), where the ASN is a decimal representation of the ASN, ASNB is a binary representation of the ASN, ASNB = $(h_{2n-1}h_{2n-2} \ldots h_1h_0)_2$, and n represents an order of a Hilbert curve.

1: Data = $\{0, 1, 2, \ldots n - 1\}$
2: $<v_0, v_1>$ = Rot(ASNB, n, 0)
3: for each num k∈ Datado
4:     $x_k = (v_{0,k} \times (\sim h_{2k})) \oplus v_{1,k} \oplus h_{2k+1}$
5:     $y_k = (v_{0,k} + h_{2k}) \oplus v_{1,k} \oplus h_{2k+1}$
6: Hout = $<x, y>$ = $<(x_{n-1}x_{n-2} \ldots x_0)_2, (y_{n-1}y_{n-2} \ldots y_0)_2>$
8. returnHout

---

Algorithm 2: Rot(ASNB, n, k), where ASNB represents the binary representation of the ASN, ASNB = $(h_{2n-1}h_{2n-2} \ldots h_1h_0)_2$, n represents the order of the Hilbert curve, and k represents an initial order.

1: If k == n
2:     $v_{0,n-1} = 0, v_{1,n-1} = 0$
3: else
4:     $<v_0, v_1>$ = Rot (ASNB, n, k + 1)
5:     $v_{0,k} = v_{0,k+1} \oplus h_{2k} \oplus \sim h_{2k+1}$
6:     $v_{1,k} = v_{1,k+1} \oplus ((\sim h_{2k}) \times (\sim h_{2k+1}))$
7: return $<v_{0,n-1}v_{0,n-2} \ldots v_{0,0}, v_{1,n-1}v_{1,n-2} \ldots v_{1,0}>$

---

The specified range of the ASNs is $[0,2^{2n-1}]$, and a corresponding order of the Hilbert mapping algorithm is n. FIG. 2 respectively illustrates two-dimensional coordinate spaces obtained by mapping the ASNs of the specified ranges of [0,3], [0, 15], [0,63], and [0,255]. The above algorithm is applied to the entire ASN space [0,65535] for dimension ascending mapping, and a corresponding Hilbert order n is equal to 8, such that the two-dimensional cyberspace coordinate system based on the AS may be determined.

Figure 3:
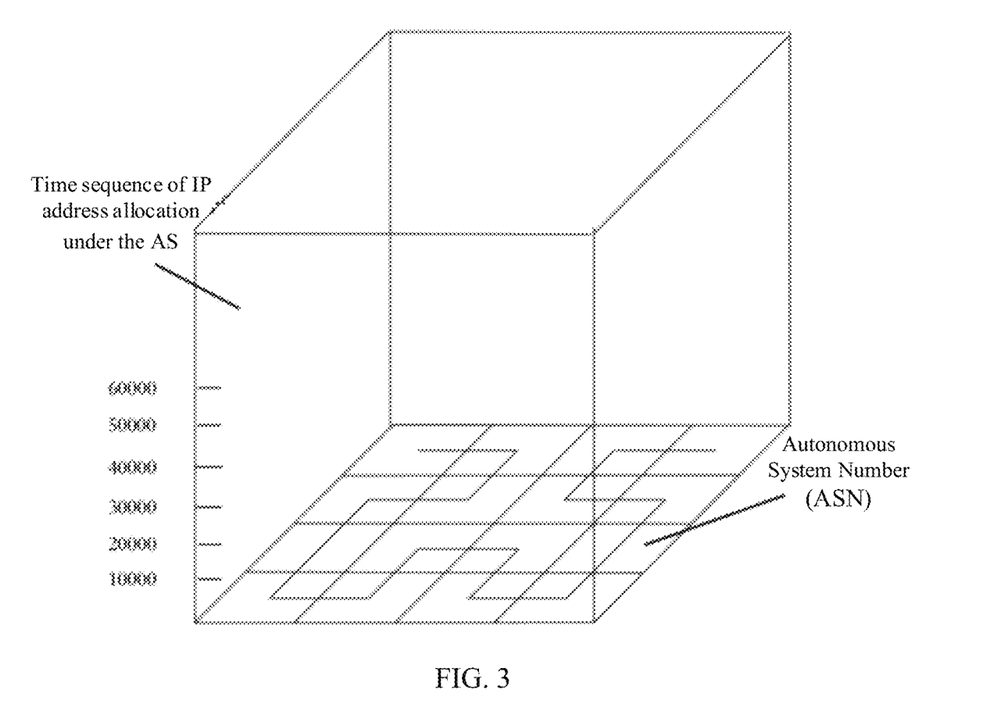
FIG. 3 is a schematic diagram showing a framework of a three-dimensional cyberspace coordinate system based on an AS according to an embodiment of the present disclosure.

FIG. 3 is a schematic diagram showing a framework of a cyberspace three-dimensional coordinate system based on an AS according to an embodiment of the present disclosure. As illustrated in FIG. 3, on the basis of the above two-dimensional coordinate system, the time sequence of the IP addresses allocation under the AS is determined as the third-dimension basic vector, and is orthogonalized to the two-dimensional AS coordinate space. A positive direction represents sequence increment. Specifically, the Z-axis mapping algorithm is defined as follows.

S1: Suppose that there are n IP addresses, $\{IP_1, IP_2, IP_3, IP_4, IP_5, IP_6, \ldots, IP_n\}$, under the jurisdiction of the AS. Also, corresponding allocation time $\{T_1, T_2, T_3, T_4, T_5, T_6, \ldots, T_n\}$ accurate to seconds is collected.

S2: All IP addresses under the AS are sorted in ascending order in accordance with the allocation time. Under the same allocation time, a new IP address sequence $\{NIP_1, NIP_2, NIP_3, NIP_4, NIP_5, NIP_6, \ldots, NIP_n\}$ is obtained by sorting the IP addresses based on decimal values of the IP address from small to large. A serial number is mapped to the third-dimension coordinate system.

As illustrated in FIG. 3, Z=10,000 represents that a certain IP address is located at a 10,000-th position in the new IP address sequence sorted based on the allocation time.

Figure 4:
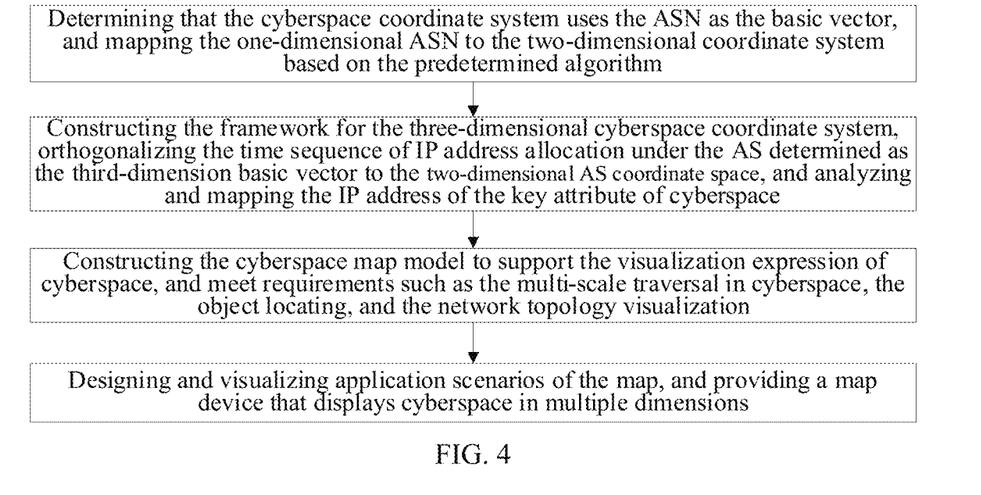
FIG. 4 is a flowchart illustrating a cyberspace coordinate system creation method based on an AS according to a specific embodiment of the present disclosure.

FIG. 4 is a flowchart illustrating a cyberspace coordinate system creation method based on an AS according to a specific embodiment of the present disclosure.

As illustrated in FIG. 4, the cyberspace coordinate system creation method based on the AS according to an embodiment includes the following steps.

(1) It is determined that the cyberspace coordinate system uses the ASN as the basic vector. The one-dimensional ASN is mapped to the two-dimensional coordinate system based on the predetermined algorithm.

In an embodiment, the cyberspace coordinate system is the two-dimensional coordinate space obtained based on the above Hilbert mapping algorithm, and the ASN is determined as the basic vector to represent an AS element of cyberspace.

Specifically, considering that cyberspace is a virtual information space, the free flow of massive information constitutes the instantaneous diversity of cyberspace. Selecting the basic vector that may constantly characterize the nature of cyberspace is very important for constructing the cyberspace map model.

The AS, as the collection of networks and IP addresses under the control of the management agency, is equivalent to a country in the geographic space, and is the basic unit of business exchanges and communications between domains in cyberspace.

The two-dimensional coordinate system of cyberspace based on the AS is constructed based on the above Hilbert mapping algorithm to determine a unified and constant backboard, thereby showing AS elements of cyberspace.

(2) The framework for the three-dimensional cyberspace coordinate system is constructed. The time sequence of IP address allocation under the AS determined as the third-dimension basic vector is orthogonalized to the two-dimensional AS coordinate space. The IP address of the key attribute of cyberspace is analyzed and mapped.

Specifically, since the two-dimensional coordinate system is limited to only expressing AS elements, the IP address, as a unique fingerprint allocated when a device is connected to the network in cyberspace, provides a location and a network interface identifier of a host in cyberspace, and is the key identifier of all cyberspace resource elements.

Therefore, in the present disclosure, the time sequence of the IP address allocation under the AS is added on a basis of the two-dimensional coordinate system as a third-dimension vector orthogonal to the AS to construct the framework for the three-dimensional cyberspace coordinate system, thereby expressing IP information.

For example, a certain IP address 166.111.8.2 belongs to AS4538. A plane coordinate (24, 76) is obtained based on an ASN2xy algorithm. All IP addresses under the jurisdiction of AS4538 are sorted in a chronological order based on the above Z-axis mapping algorithm, and a sequence number 8902 of the allocation time of 166.11.8.2 is determined as a Z-axis representation of the IP address. Therefore, in the three-dimensional coordinate system, (24, 76, 8902) will be the coordinates of the IP address, and indicates the corresponding networked device on the Internet, thereby expressing resource information of cyberspace.

Specifically, compared with the cyberspace coordinate system based on IP addresses, the present disclosure may better solve essential problems of cyberspace. For example, an IP address space is too large to be fully expressed, it is difficult to find a better visualization solution for $2^{32}$, i.e., about 4 billion address spaces, and the discontinuous allocation of IP address segments results in scattered IP addresses under the same AS. Taking AS4538 as an example, IP address segments under AS4538 include 101.4.0.0/14, 101.5.0.0/16, 101.77.0.0/16, 111.186.0.0/15, 114.212.0.0/16, etc. In the visualization process, the same AS is scattered in various positions of an IP address coordinate system, and thus the expression result is unsatisfying.

(3) The cyberspace map model is constructed to support the visualization expression of cyberspace, and meet requirements such as the multi-scale traversal in cyberspace, the object locating, and the network topology visualization.

Specifically, although the cyberspace coordinate system based on the AS may intuitively express an IP granularity, it is insufficient to show a hierarchical presentation of details of cyberspace. The requirements of the multi-scale traversal in cyberspace and locating various Internet objects cannot be met through the cyberspace coordinate system. Constructing the cyberspace map model with the concept of the geographic map model needs to satisfy map characteristics of scalability and hierarchy in consideration of different visualization requirements of different users for elements distribution in cyberspace, resource information, connection relations, and the like. Also, the cyberspace is the second largest space parallel to the geographic space. Since there are corresponding geographic maps and thematic maps in the geographic space that may express mountains, rivers, and city streets in a scalable manner, the cyberspace map model also needs to design some thematic map modules to achieve a multi-dimensional display of specific network details. The present disclosure takes the topological thematic map as an example for designing and explanation.

Specifically, to support the multi-scale traversal in cyberspace and have map characteristics of scalability and hierarchy, cyberspace needs to be divided into different hierarchies. With reference to the geographic map model, the hierarchical structure of cyberspace is determined to be divided into three hierarchies, i.e., the AS, the network, and the IP. The AS is analogous to countries, the network corresponds to provinces and cities, and the IP addresses are equivalent to house numbers of residential buildings. A method based on the rectangular tree diagram supports the multi-scale traversal in cyberspace and the object locating. Through a hierarchy-by-hierarchy expansion of the cyberspace resource elements, fine-grained visualization of the network composition under a certain AS and the composition of IP addresses under the network is realized, thereby facilitating asset management and operation maintenance of different levels of network management persons.

Specifically, object locating in cyberspace is supported. Hierarchical structures of resources of the AS, the network, and the IP addresses in cyberspace are abstracted into a tree. Root nodes represent all resources in cyberspace. The cyberspace is divided based on the AS to obtain a number of sub-nodes representing the AS. Large and small networks under the AS may be used as a division and an extension of AS nodes. A natural structure of the tree may be used to express an inclusion relationship between networks. For example, China Education and Research Network (Cernet) includes a backbone network, and campus networks of more than 100 colleges and universities including Tsinghua University, Peking University, Wuhan University, Zhengzhou University, and Hunan University. Each campus network may also be divided into different regional Local Area Networks (LANs), such as the LAN of CERNET under the campus network of Tsinghua University. IP resources are used as leaf nodes to fill the network nodes, thereby constructing a cyberspace resource tree. The rectangular tree diagram, as a chart structure to realize an intuitive visualization of the hierarchical structure, uses a rectangle to represent nodes in a tree-shaped hierarchical structure. A hierarchical relationship between parent and child nodes is expressed by metaphors of mutual nesting between the rectangles.

(4) Application scenarios of the map are designed and visualized. The present disclosure provides a map device that displays cyberspace in multiple dimensions.

Specifically, it is designed that the application scenarios of the map include the real-time attack scenario and the DDOS attack scenario in cyberspace. The above cyberspace map models respectively define concepts such as a cyberspace coordinate system based on the AS, the hierarchical structure of the cyberspace map, the topological thematic map, etc., on which basis statistics results of data are visualized, and security scenarios of cyberspace are presented in different dimensions.

Scenario 1: the real-time attack scenario in cyberspace. Real-time attack data of the global Internet in a honeypot is collected. Coordinates (X, Y, Z) of the attack source and the destination IP address in the three-dimensional cyberspace coordinate system based on the AS are calculated based on the above mapping algorithm to visualize the real-time attack scenario. The flying line represents the attack direction, and the line thickness represents the attack traffic. The traffic characteristic of the network attack is observed by using the AS as a granularity to analyze the attack behavior, thereby assisting the security analyst in better understanding and defending against attacks.

Scenario 2: the DDOS attack scenario in cyberspace. On a basis of data of a DDOS attack on a Tsinghua server, the coordinates (X, Y, Z) of the attack source and the destination IP address in the three-dimensional cyberspace coordinate system based on the AS are calculated based on the above mapping algorithm. The line thickness represents the attack traffic. Compared with the geographic map, obtaining information of the AS, the network, and the IP address of the attack source and the target through expansions at different hierarchies may quickly locate security problems and perform vulnerability diagnosis and repair.

In addition, drawing the above attack scenarios in the topological thematic map may visually display the topological path that the attack went through, thereby realizing the topological traceability and discovery of the attack source, and guiding the change of the connectivity of the Internet infrastructure when the network security attack is encountered.

Figure 5A:
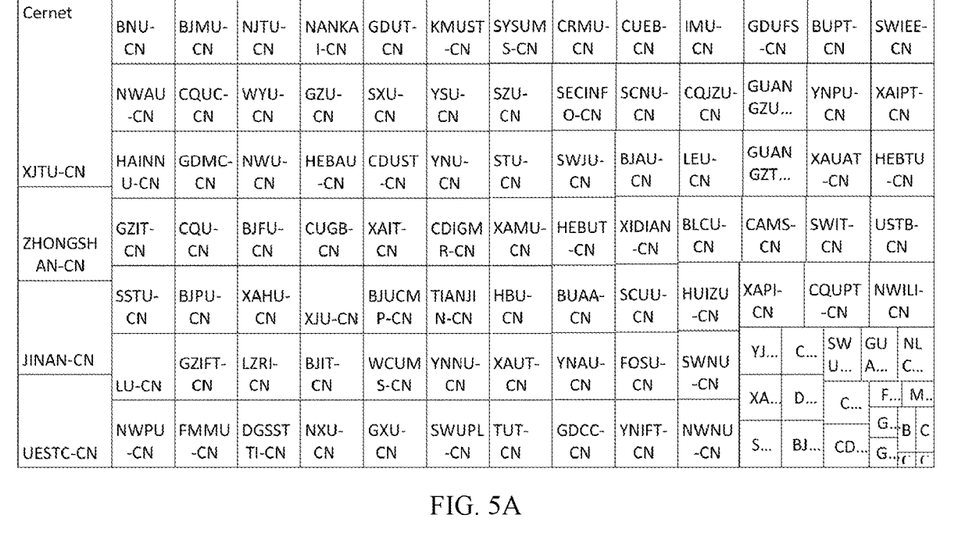

FIGS. 5A and 5B are a schematic diagram showing a hierarchical and multi-scale expression of resource elements of cyberspace based on a rectangular tree diagram in a cyberspace map model. Specifically, AS4538 in a cyberspace map based on the AS is clicked to visualize the resource composition of the AS node. All large networks under AS4538 are visualized. Here, the all large networks only include the Cernet network. The size of the rectangle represents that a number of IP addresses of the Cernet network is 17,170,688. A further expansion is performed to visualize the distribution of small campus networks under the Cernet network node, as illustrated in FIG. 5A. Nodes of the campus network are orthogonal to each other and do not overlap. The number of IP addresses is represented by the size of the rectangle, and the label presents specific network information, e.g., a range of IP addresses of a campus network GUANGZTC-CN of the South China Normal University is 202.192.32.0-202.192.47.0, which contains 3,840 IP addresses. A campus network administrator may click on the campus network to enter an IP hierarchy and visualize IP resource nodes under nodes of the campus network. For example, FIG. 5B illustrates IP address information under GUANGZTC-CN. Depending on degrees of attention of different resources received from a management person, weights are assigned to resources to which different IP addresses belong, e.g., a weight of a server is 3, a weight of a host 1, and a weight of a printer is 2. The size of the rectangle is used for distinguishing.

Through hierarchical, scalable and intuitive expression, fine-grained resource information in cyberspace may be presented to meet visualization requirements of management persons at different levels.

Specifically, the above cyberspace map model only realizes multi-scale visualization and locating of elements in the network resource. Considering that topological connection is an important attribute of cyberspace, the topological connection is often used to express a connection relationship of cyberspace units for realizing management over elements and links. It is necessary to introduce the concept of the topological thematic map to realize the visualization of the topology and display a structure of the topological connection. The research is mainly carried out from the AS hierarchy, the network hierarchy, and the IP hierarchy. Each cyberspace unit may be composed of cyberspace subunits. Division and dimension descending are performed on cyberspace to achieve multi-level and fine-grained cognition of cyberspace.

Specifically, topology visualization is supported. When the topological thematic map is designed to achieve multi-dimensional display of specific network details, the topological connection relationship for a certain AS may be directly represented by flying lines in the cyberspace coordinate system based on the AS. The topological connection relationship of the certain AS may be drawn based on Border Gateway Protocol (BGP) data. However, considering that the topological connection relationship between global network units is relatively complicated, the drawing of a global network topology may cause severe crossing between flying lines, resulting in a poor visualization effect. In this case, an additional cyberspace sphere mode may be designed as the topological thematic map. A new mapping algorithm is adopted to remap the AS to the three-dimensional space. It is expected to find a new arrangement to make crossing between the flying lines as little as possible. The force-directed algorithm, as a classic graph layout algorithm, calculates a position that a combined force of gravity and repulsion moves each node, and considers applying the position to visualization of the AS topological thematic map for presenting a more reasonable layout.

Further, the AS nodes may be used as a set of nodes in the force-directed algorithm. A BGP connection between ASes is used as an edge. The algorithm is specifically implemented as follows.

---

Algorithm 3: TopologyMap(N, V, M, S, ks) An input N represents a set of AS nodes, V represents a set of topological connections between ASes, M represents a number of iterations of the algorithm, S represents a size of a canvas, and ks represents a constant number for calculating gravity 1: for each node n∈ N //set an initial position of a random node
2:   coordinate(n) = [random(x), random(y), random(z)]
3: while i < M do        //M iterations
4:   for each node n1∈ N//calculate a displacement caused by a Coulomb repulsion between two points
5:     for each node n2∈ N
6:       k = (S/N · size( ))$^2$
7:       distance(n1, n2) += k/‖n1 − n2‖$^2$
8:   for each edge v∈ V// n1, n2 are two end points of v, calculate a displacement caused by Hooke's gravity
9:       distance(n1, n2) −= ks(‖n2 − n1‖)
10:  for each d∈ distance: //recalculate a new position of the node based on an offset displacement

---

Algorithm 3: TopologyMap(N, V, M, S, ks) An input N represents a set of AS nodes, V represents a set of topological connections between ASes, M represents a number of iterations of the algorithm, S represents a size of a canvas, and ks represents a constant number for calculating gravity 11:  coordinate(n1) is updated by d
12:  coordinate(n2) is updated by d

---

Figure 6:
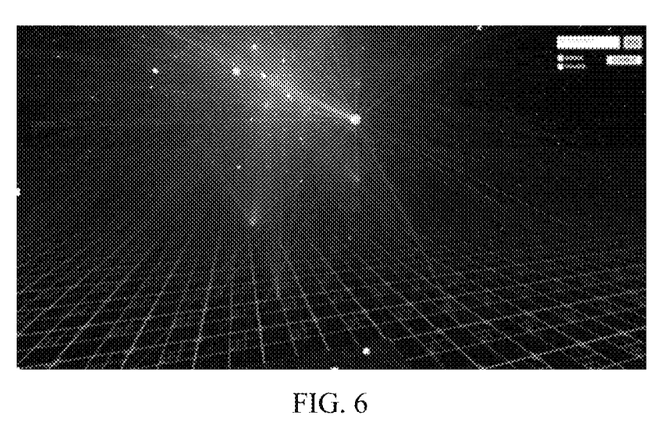
FIG. 6 is a topological thematic map that intuitively expresses an AS topological connection relationship based on a force-directed algorithm in a cyberspace model according to an embodiment of the present disclosure.

FIG. 6 illustrates a topological thematic map that intuitively expresses an AS topological connection relationship based on a force-directed algorithm in a cyberspace model. The AS is a global routing strategy unit. A traffic relationship of the AS defines a high-level global Internet topology.

As illustrated in FIG. 6, taking the AS topology as an example, on a basis of the number of IP addresses and the BGP data under the jurisdiction of the AS, the above force-directed algorithm is used to map the AS to the new three-dimensional coordinate (X, Y, Z). The size of a sphere of the AS represents the number of IP addresses under the AS. When a specific AS is selected, the topological connection directly connected to the specific AS will be displayed. The flying line represents the topological connection relationship. The line thickness represents traffic information. In addition, the topological thematic map is also suitable for the internal network topologies (e.g. IP topology) under the AS, thereby guiding a network management person to change the connectivity of the Internet infrastructure when a security attack is encountered, assisting the network management person in checking hardware configuration, determining a position to add a new route, and finding bottlenecks and faults in the network.

In the present disclosure, by taking nature characteristics of the network, e.g., the AS and the IP address, the framework for the cyberspace coordinate system is constructed, the cyberspace map model is established, and the visualization of multi-dimensional information in cyberspace based on the unified and constant backboard is realized. The AS topology, the IP address composition, the network resource element information, the hierarchical structure, and the like are included, thereby intuitively and effectively expressing cyberspace. Compared with a method for creating an architecture of the cyberspace coordinate system on a basis of the IP addresses and logical ports, an essential problem of visualization may be better solved, i.e., the poor visualization effect caused by the discontinuous allocation of IP segments under a AS and a network, and the hierarchical structure of the network and the AS topological connection relationship may be expressed intuitively. In addition, in the present disclosure, a map device that displays cyberspace in multiple dimensions is provided. The map device is applied to visualization scenarios such as network security attacks and network management, so as to fill gaps in spatial theoretical models in cyberspace research and promote the development of cyberspace security and surveying and mapping.

Figure 7:
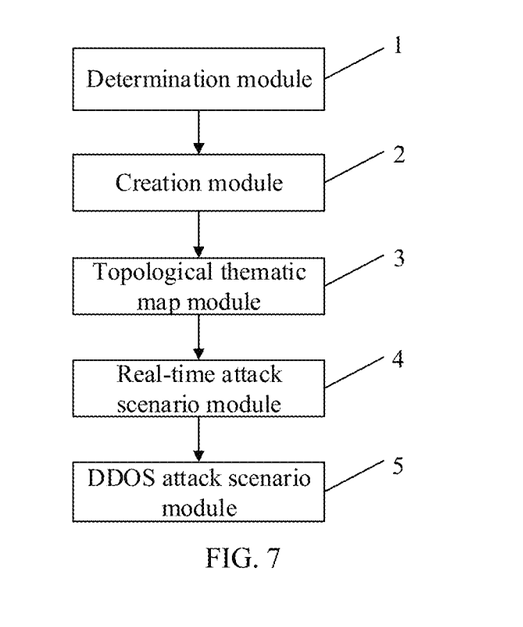
FIG. 7 is a block diagram showing a structure of a map creation device for multi-dimensional display of cyberspace of a cyberspace coordinate system based on an AS according to an embodiment of the present disclosure.

In the present disclosure, a map creation device for multi-dimensional display of cyberspace of the cyberspace coordinate system based on the AS is designed.

FIG. 7 illustrates a block diagram showing a structure of a map creation device. The device includes a determination module 1, a creation module 2, a topological thematic map module 3, a real-time attack scenario module 4, and a DDOS attack scenario module 5.

The determination module 1 is configured to determine the cyberspace coordinate system based on the AS, and realize the analysis and mapping of the IP addresses of the cyberspace elements.

The creation module 2 is configured to create the cyberspace map model, determine that the hierarchical structure of cyberspace is divided into three hierarchies: the AS, the network, and the IP, and express, based on the rectangular tree diagram, the resource elements of cyberspace in a hierarchical and scalable manner.

The topological thematic map module 3 is configured to define the sphere mode of cyberspace to display the topological thematic map, and use the force-directed algorithm to map the AS to the new three-dimensional coordinate (X, Y, Z), so as to realize management over the cyberspace elements and links.

The real-time attack scenario module 4 is configured to visualize the real-time attack scenario in the cyberspace map model, which may assist the security researchers in better understanding and defending against attacks.

The DDOS attack scenario module 5 is configured to visualize the DDOS attack scenario in the cyberspace map model, which may quickly locate security issues and perform vulnerability diagnosis and repair.

Further, the cyberspace coordinate system is a three-dimensional coordinate system.

Further, the determining module 1 is specifically configured to: construct the three-dimensional cyberspace coordinate system, map the AS to the two-dimensional coordinate space based on the above predetermined algorithm, and determine orthogonalizing the time sequence of IP address allocation under the AS determined as the third-dimension basic vector to the two-dimensional AS coordinate space. The coordinate (x, y, z) of the IP address is located based on the Hilbert algorithm and the Z-axis mapping algorithm to realize the analysis and mapping of the IP address of the key attribute.

Figure 8:
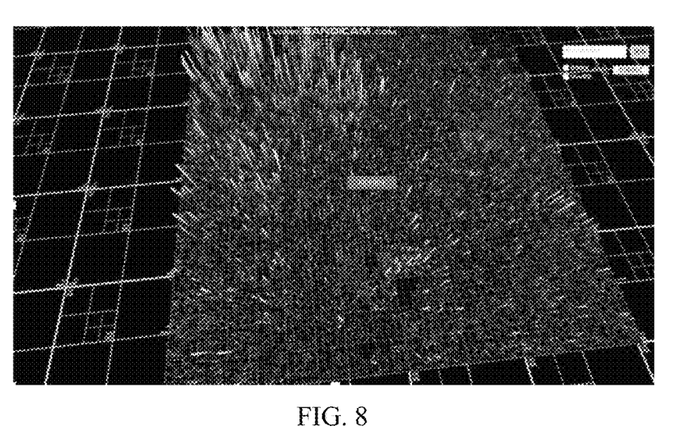
FIG. 8 is a mapping diagram of an IP address of a key attribute of cyberspace in a three-dimensional coordinate system according to an embodiment of the present disclosure.

Specifically, FIG. 8 illustrates mapping of the IP address of a key attribute of cyberspace in a three-dimensional coordinate system. By defining the three-dimensional coordinate system space to model the cyberspace, it is possible to locate any cyberspace resource element based on the IP address of the key identifier of communication. FIG. 8 illustrates an analysis and mapping of a global IP address space ($2^{32}$). Firstly, the ASN to which the IP addresses belong is located. Secondly, the coordinate (X, Y, Z) is located based on the above ASN2xy algorithm and the Z-axis mapping algorithm. The AS is used as the basic vector to express the IP address element of cyberspace.

Further, the cyberspace map model is built on the cyberspace coordinate system based on the AS.

The creation module 2 is specifically configured to construct the cyberspace map model, and support the requirements of the multi-scale traversal in cyberspace, the network topology visualization, and the object locating in cyberspace. The hierarchical structure refers to the geographic map model. The AS is analogous to countries, the network corresponds to provinces and cities, and the IP addresses are equivalent to house numbers of residential buildings. The hierarchical and scalable expression of the resource elements, such as the network composition under the AS and the IP composition under the network, of cyberspace is performed based on the rectangular tree diagram, so as to meet the visualization requirements of different levels of management persons.

Further, the topological thematic map module 3 is specifically configured to realize the topology visualization of different hierarchical structures. Taking the AS hierarchy as an example, on a basis of the number of IP addresses and the BGP data under the jurisdiction of the AS, the force-directed algorithm is used to map the AS to the new three-dimensional coordinate (X, Y, Z). The size of a sphere of the AS represents the number of IP addresses under the AS, and the flying line represents the topological connection relationship. A network management person is guided to change the connectivity of the Internet infrastructure, check the hardware configuration, determine the position where new routers should be added, and find bottlenecks and faults in the network when a security attack is encountered.

The real-time attack scenario module 4 is specifically configured to visualize the real-time attack scenario in the network map model, including the cyberspace coordinate system based on the AS and the topological thematic map. By observing traffic characteristics of the network attack at the AS granularity and analyzing attack behaviors, topological traceability and discovery of the attack source are realized to help the security analyst better understand and defend against attacks.

Figure 9A:
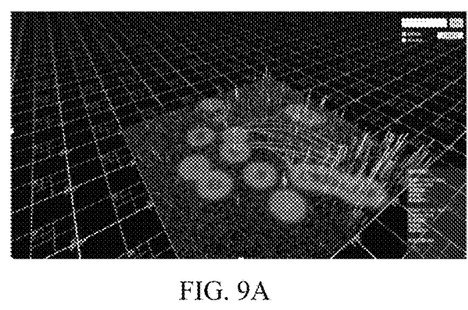
FIGS. 9A and 9B are a schematic diagram showing a real-time attack scenario module of a cyberspace map according to an embodiment of the present disclosure.
Figure 9B:
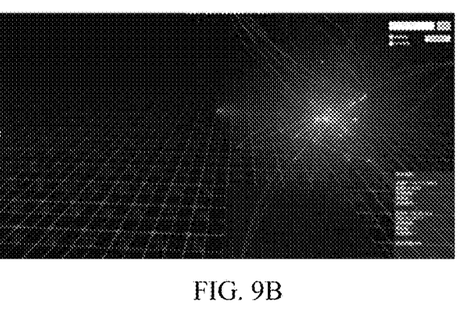

FIGS. 9A and 9B illustrate a schematic diagram showing a real-time attack scenario module of a cyberspace map. As illustrated in FIG. 9A, the global real-time attack scenario is visualized on the cyberspace coordinate system based on the AS. The coordinates (X, Y, Z) of the attack source and the destination IP address in the three-dimensional cyberspace coordinate system based on the AS are obtained based on the above mapping algorithm. The flying line represents the attack direction. The line thickness represents the attack traffic. An attack data analysis is attached. It may be observed that the IP is stacked on a corresponding AS. There are skyscrapers (large AS) and small thatched houses (small AS). A large AS launches attacks from a number of IP addresses and has large firepower. Here, the line thickness represents the firepower of an attack. Also, the large AS receives attacks from many other ASes are received due to large targets. A small AS (small thatched house) has weak firepower but suffers fewer attacks. Therefore, it is convenient to observe traffic characteristics of the network attack by using the AS as the granularity and analyze the attack behavior. FIG. 9B illustrates drawing the real-time attack scenario in the AS topological thematic map. Some large ASes at the center are often both initiators of real-time attacks and attack targets of other ASes. In addition, clicking on an AS may display the topological connections between the ASes, thereby realizing the topological traceability and discovery of the attack source.

The DDOS attack scenario module 5 is specifically configured to visualize the DDOS attack scenario in the network map model. Compared with the geographic map, the AS, the network, and the IP address information of the attack source and the target may be obtained through different hierarchies of expansions, thereby quickly locating security issues, and performing vulnerability diagnosis and repair. Also, shielding data packets transmitted from an attack source IP address is also an effective defense against a DDOS behavior.

Figure 10A:
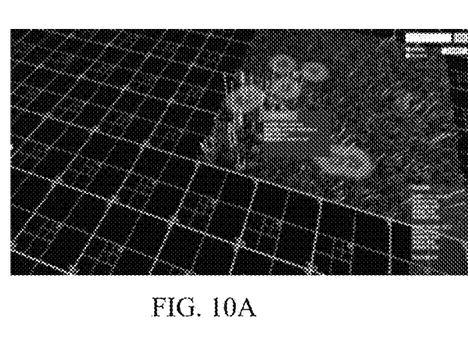
FIGS. 10A and 10B are a schematic diagram showing a Distributed Denial of Service (DDOS) attack scenario module of a cyberspace map according to an embodiment of the present disclosure.
Figure 10B:
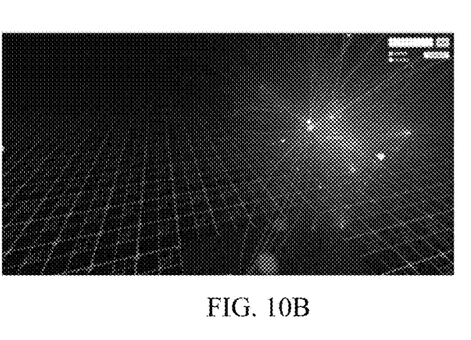

FIGS. 10A and 10B are schematic diagrams showing a Distributed Denial of Service (DDOS) attack scenario module of a cyberspace map according to an embodiment of the present disclosure. As illustrated in FIG. 10A, the DDOS attack scenario on the server of the Tsinghua University is visualized on the cyberspace coordinate system based on the AS. Coordinates (X, Y, Z) of DDOS puppet hosts and the destination IP addresses in the three-dimensional cyberspace coordinate system based on the AS are calculated. The flying line represents the attack direction. The line thickness represents the attack traffic. The attack data analysis is attached. Compared with the geographic map, which may only be able to refine network resources in the geographic space, the present disclosure realizes that clicking on the AS where the puppet host is located can expand, based on the rectangular tree diagram, the cyberspace resource element where the puppet host is located hierarchy by hierarchy, thereby displaying the network information, the IP segment information, and the IP information of the attack source in a fine-grained manner, and shielding the data packets transmitted from the IP address segment of the attack source for temporary protection. FIG. 10B illustrates drawing the DDOS attack scenario on the AS topological thematic map. By viewing topological connection relationships of many puppet hosts, a possible location of an attacker is analyzed based on cross information, and the attacker may be traced and discovered. In addition, understanding the topology of a target host may guide the management persons to change the connectivity of the Internet infrastructure in the event of a security attack.

In the cyberspace coordinate system creation method based on the AS according to the present disclosure, the three-dimensional cyberspace coordinate system is constructed by determining that the ASN is orthogonal to the time sequence of the IP address allocation under the AS, so as to realize precise locating and description of the IP address of a unique identifier in cyberspace. Compared with the cyberspace coordinate system based on the IP addresses, essential problems of the cyberspace may be better solved, e.g., a large space occupied by the IP addresses, and an unsatisfying expression effect caused by discontinuous allocation of the IP segments under the AS and the network.

On the basis of the above description, constructing the cyberspace map model with the concept of the geographic map model supports the multi-scale traversal in cyberspace, the network topology visualization, and the object locating in cyberspace. Visualization requirements of the distribution and the resource information of different cyberspace objects (the AS, the network, and the IP) of different users are taken into consideration, thereby realizing characteristics of scalability and hierarchy of the map. Also, the thematic map module is designed to realize the multi-dimensional display of details of network topology, so as to meet different visualization requirements of management persons. In addition, the present disclosure also completes the design of the real-time attack and DDOS scenarios and implements the visualization of the security scenarios of map applications. Intuitive renderings are convenient for the management persons to analyze traffic and realize the topological traceability and discovery of the attack source. Compared with conventional research based on mature theoretical models, the present disclosure provides a unified backboard for the visualization of multi-dimensional information in cyberspace, thereby filling in the gaps in the theoretical model of cyberspace maps.

A cyberspace coordinate system creation apparatus based on an AS according to an embodiment of the present disclosure will be described below with reference to the accompanying drawings.

Figure 11:
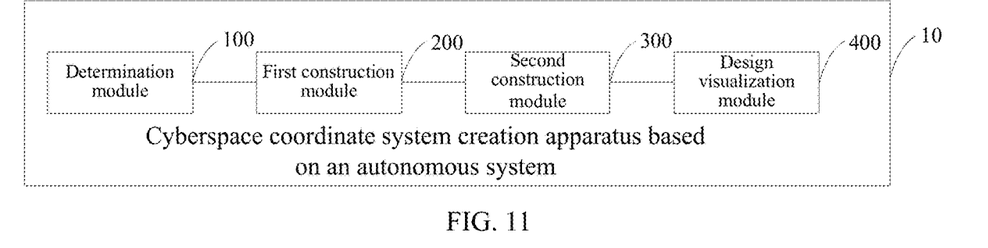
FIG. 11 is a block diagram showing a structure of a cyberspace coordinate system creation apparatus based on an AS according to an embodiment of the present disclosure.

FIG. 11 is a block diagram showing a structure of a cyberspace coordinate system creation apparatus based on an AS according to an embodiment of the present disclosure.

As illustrated in FIG. 11, the cyberspace coordinate system creation apparatus based on the AS includes a determination module 100, a first construction module 200, a second construction module 300, and a design visualization module 400.

The determination module 100 is configured to determine a cyberspace coordinate system. The first construction module 200 is configured to construct a framework for a three-dimensional cyberspace coordinate system. The second construction module 300 is configured to construct a cyberspace map model based on the cyberspace coordinate system and the framework for the three-dimensional cyberspace coordinate system. The design visualization module 400 is configured to design an application scenario corresponding to a constructed cyberspace map model, and perform visualization processing on the application scenarios.

The creation apparatus can realize the visualization of multi-dimensional information of cyberspace based on a unified and constant backboard, e.g., the AS topology, the IP address composition, the network resource element information, the hierarchical structure, and the like, and is suitable for visualization of a number of security attacks on the cyberspace and network management scenarios.

Further, in an embodiment of the present disclosure, the cyberspace coordinate system is a two-dimensional coordinate system. The determination module is configured to map, based on a predetermined algorithm, a one-dimensional ASN to a two-dimensional coordinate space. Mapping, based on the predetermined algorithm, the one-dimensional ASN to the two-dimensional coordinate space includes performing dimension ascending mapping on the ASN by using a Hilbert mapping algorithm, and determining that coordinates of the cyberspace coordinate system collectively represent an AS attribute of cyberspace.

Further, in an embodiment of the present disclosure, the first construction module is configured to orthogonalize a time sequence of IP address allocation under the AS determined as a third-dimension basic vector to the two-dimensional AS coordinate space, and analyze and map an IP address of a key attribute of cyberspace.

Further, in an embodiment of the present disclosure, the second construction module is configured to: determine that a hierarchical structure of a cyberspace is divided into three layers: the AS, a network, and an IP; and define a sphere mode of cyberspace.

It should be noted that the above explanation of the embodiments of the cyberspace coordinate system creation method based on the AS is also applicable to the cyberspace coordinate system creation apparatus based on the AS according to the embodiments, and thus repeated description is omitted here.

The cyberspace coordinate system creation apparatus based on the AS according to an embodiment of the present disclosure has specific advantages over conventional geographic coordinate system, the topological coordinate system, and the cyberspace coordinate system based on the IP address. The creation apparatus may realize the visualization of multi-dimensional information of cyberspace based on a unified and constant backboard, e.g., the AS topology, the IP address composition, the network resource element information, the hierarchical structure, and the like, and is suitable for visualization of a number of security attacks on the cyberspace and network management scenarios.

In addition, terms such as "first" and "second" are used herein for purposes of description and are not intended to indicate or imply relative importance, or imply a number of indicated technical features. Thus, the feature defined with "first" and "second" may include one or more this feature explicitly or implicitly. In the description of the present disclosure, "a plurality of" means at least two, for example, two or three, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the described particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of the present disclosure have been shown and described above, it should be understood that above embodiments are just explanatory, and cannot be construed to limit the present disclosure. For those skilled in the art, changes, alternatives, and modifications can be made to the embodiments without departing from the scope of the present disclosure.

What is claimed is:

1. A cyberspace coordinate system creation method based on an Autonomous System (AS), comprising:
    determining a two-dimensional cyberspace coordinate system, by mapping, based on a predetermined algorithm, a one-dimensional AS Number (ASN) to a two-dimensional coordinate space;
    constructing a framework for a three-dimensional cyberspace coordinate system, by orthogonalizing a time sequence of Internet Protocol (IP) address allocation under the AS determined as a third-dimension basic vector to a two-dimensional AS coordinate space, and analyzing and mapping an IP address of a key attribute of cyberspace;
    constructing a cyberspace map model based on the cyberspace coordinate system and the framework for the three-dimensional cyberspace coordinate system; and
    designing an application scenario corresponding to a constructed cyberspace map model, and visualizing the application scenario based on the constructed cyberspace map model,
    wherein the framework for the three-dimensional cyberspace coordinate system is a three-dimensional coordinate system that comprises a third-dimension coordinate axis perpendicular to a basic vector of a two-dimensional AS;
    said orthogonalizing the time sequence of the IP address allocation under the AS determined as the third-dimension basic vector to the two-dimensional AS coordinate space comprises:
    representing the time sequence of the IP address allocation under the AS by a third coordinate axis perpendicular to the two-dimensional coordinate system, a positive direction representing sequence increment; and
    said analyzing and mapping the IP address of the key attribute of cyberspace comprises:
    modeling the cyberspace by defining a three-dimensional coordinate system space, and locating any cyberspace resource element based on an IP address of a key identifier of communication, wherein a Z-axis mapping algorithm is described as sorting, based on allocation time, all IP addresses under a certain AS in ascending order, and sorting IP addresses under the same allocation time from small to large in decimal, and serial numbers of the sorted IP addresses are mapped to a third-dimension coordinate system; and
    analyzing and mapping the IP address by locating a coordinate based on a Hilbert algorithm and the Z-axis mapping algorithm.

2. The method according to claim 1, wherein
    the predetermined algorithm is a Hilbert mapping algorithm, and said mapping, based on the predetermined algorithm, the one-dimensional ASN to the two-dimensional coordinate space comprises:
    performing dimension ascending mapping on the ASN by using the Hilbert mapping algorithm, and determining that two-dimensional coordinates of the two-dimensional cyberspace coordinate system collectively represent an AS attribute of cyberspace.

3. The method according to claim 1, wherein said constructing the cyberspace map model based on the cyberspace coordinate system and the framework for the three-dimensional cyberspace coordinate system comprises:
    determining that a hierarchical structure of a cyberspace is divided into three layers: the AS, a network, and an IP; and
    defining a sphere mode of cyberspace, wherein the AS is mapped to another three-dimensional space by adopting a force-directed algorithm and taking the AS as a node in the force-directed algorithm, the AS being denoted as a sphere in the other three-dimensional space, and the sphere having a size positively correlated to a number of IP addresses under the AS.

4. The method according to claim 1, wherein said designing the application scenarios corresponding to the constructed cyberspace map model, and visualizing the application scenario comprises:
    calculating, based on a mapping algorithm, coordinates of an attack source and a destination IP address in a three-dimensional cyberspace coordinate system based on the AS to visualize a real-time attack scenario, wherein a flying line represents an attack direction from an attacker to a victim, and a line thickness represents and is positively correlated to attack traffic; and
    calculating, based on the mapping algorithm, the coordinates of the attack source and the destination IP address in the three-dimensional cyberspace coordinate system based on the AS, wherein the line thickness represents and is positively correlated to an attack frequency.

5. A cyberspace coordinate system creation apparatus based on an Autonomous System (AS), comprising a memory and a processor, the memory having a computer program stored therein, and the processor being configured to execute the computer program to perform a method, comprising:
    determining a two-dimensional cyberspace coordinate system, by mapping, based on a predetermined algorithm, a one-dimensional AS Number (ASN) to a two-dimensional coordinate space;
    constructing a framework for a three-dimensional cyberspace coordinate system, by orthogonalizing a time sequence of Internet Protocol (IP) address allocation under the AS determined as a third-dimension basic vector to a two-dimensional AS coordinate space, and analyzing and mapping an IP address of a key attribute of cyberspace;
    constructing a cyberspace map model based on the cyberspace coordinate system and the framework for the three-dimensional cyberspace coordinate system; and
    designing an application scenario corresponding to a constructed cyberspace map model, and visualizing the application scenario based on the constructed cyberspace map model, wherein the framework for the three-dimensional cyberspace coordinate system is a three-dimensional coordinate system that comprises a third-dimension coordinate axis perpendicular to a basic vector of a two-dimensional AS;

said orthogonalizing the time sequence of the IP address allocation under the AS determined as the third-dimension basic vector to the two-dimensional AS coordinate space comprises:

representing the time sequence of the IP address allocation under the AS by a third coordinate axis perpendicular to the two-dimensional coordinate system, a positive direction representing sequence increment; and said analyzing and mapping the IP address of the key attribute of cyberspace comprises:

modeling the cyberspace by defining a three-dimensional coordinate system space, and locating any cyberspace resource element based on an IP address of a key identifier of communication, wherein a Z-axis mapping algorithm is described as sorting, based on allocation time, all IP addresses under a certain AS in ascending order, and sorting IP addresses under the same allocation time from small to large in decimal, and serial numbers of the sorted IP addresses are mapped to a third-dimension coordinate system; and analyzing and mapping the IP address by locating a coordinate based on a Hilbert algorithm and the Z-axis mapping algorithm.

6. The apparatus according to claim 5, wherein
the predetermined algorithm is a Hilbert mapping algorithm, and said mapping, based on the predetermined algorithm, the one-dimensional ASN to the two-dimensional coordinate space comprises:

performing dimension ascending mapping on the ASN by using the Hilbert mapping algorithm, and determining that two-dimensional coordinates of the two-dimensional cyberspace coordinate system collectively represent an AS attribute of cyberspace.

7. The apparatus according to claim 5, wherein said constructing the cyberspace map model based on the cyberspace coordinate system and the framework for the three-dimensional cyberspace coordinate system comprises:

determining that a hierarchical structure of a cyberspace is divided into three layers: the AS, a network, and an IP; and defining a sphere mode of cyberspace, wherein the AS is mapped to another three-dimensional space by adopting a force-directed algorithm and taking the AS as a node in the force-directed algorithm, the AS being denoted as a sphere in the other three-dimensional space, and the sphere having a size positively correlated to a number of IP addresses under the AS.

* * * * *